US012724727B2

(12) United States Patent
Araiza

(10) Patent No.: US 12,724,727 B2
(45) Date of Patent: Sep. 1, 2026

(54) CLOSED-LOOP TIMING CONTROL USING ACTIVE RE-TRAINING ENGINES IN MEMORY SYSTEMS

(71) Applicant: SK Hynix NAND Product Solutions Corp., Rancho Cordova, CA (US)

(72) Inventor: Jorge Martinez Araiza, Beaverton, OR (US)

(73) Assignee: SK Hynix NAND Product Solutions Corp., Rancho Cordova, CA (US)

( * ) Notice: Subject to any disclaimer, the term of this patent is extended or adjusted under 35 U.S.C. 154(b) by 236 days.

(21) Appl. No.: 18/386,464

(22) Filed: Nov. 2, 2023

(65) Prior Publication Data

US 2025/0147906 A1 May 8, 2025

(51) Int. Cl.
*G06F 13/16* (2006.01)
*G06F 1/10* (2006.01)
*G06F 13/42* (2006.01)

(52) U.S. Cl.
CPC ............ *G06F 13/1689* (2013.01); *G06F 1/10* (2013.01); *G06F 13/4282* (2013.01)

(58) Field of Classification Search
CPC ..... G06F 13/1689; G06F 13/4282; G06F 1/10
USPC .......................................................... 713/503
See application file for complete search history.

(56) References Cited

U.S. PATENT DOCUMENTS 12,367,160 B2 * 7/2025 Mathur ............... G06F 13/1689
2020/0286535 A1 9/2020 Hwang
2022/0083257 A1 * 3/2022 Kachare ................ G06F 3/0655
2022/0300197 A1 9/2022 Sethuraman et al.
2022/0342823 A1 * 10/2022 D'Eliseo ............. G06F 12/0215
2022/0405190 A1 12/2022 Lee et al.
2023/0068580 A1 3/2023 Siau et al.
2023/0215477 A1 7/2023 Jeong et al.
2023/0412281 A1 * 12/2023 Das Sharma ........ H04B 10/516
2025/0103091 A1 * 3/2025 Kim .......................... G06F 1/10

OTHER PUBLICATIONS

SK Hynix NAND Product Solutions Corp. (dba Solidigm), PCT/US2024/053715, International Search Report and Written Opinion, Feb. 13, 2025, 10 pgs.

* cited by examiner

*Primary Examiner* — Brian T Misiura
(74) *Attorney, Agent, or Firm* — Morgan, Lewis & Bockius LLP

(57) ABSTRACT

This application is directed to controlling data timing in a memory system. The memory system includes a controller, a memory module, and an input data bus coupled between the memory controller and the memory module. The memory system transmits a data signal and a strobe signal via the input data bus from the memory controller to the memory module, and the data signal includes a train of serial input data. The memory system determines a skew time of the data signal with respect to the strobe signal, and generates a skew signal including a train of serial skew data based on the skew time of the data signal. The skew signal is transmitted from the memory module to the memory controller via a dedicated sideband bus that is distinct from the input data bus.

20 Claims, 6 Drawing Sheets

CLOSED-LOOP TIMING CONTROL USING ACTIVE RE-TRAINING ENGINES IN MEMORY SYSTEMS

TECHNICAL FIELD

This application relates generally to memory management including, but not limited to, methods, systems, and non-transitory computer-readable media for managing data timing in a memory system.

BACKGROUND

Memory is a vital component in a computer system, serving the purpose of storing both instructions and data. Specifically, computer systems rely on non-volatile memory to retain instructions and data even when disconnected from a power source. Secondary memory options encompass hard disk drives (HDDs) and solid-state drives (SSDs). SSDs employ high-performance open NAND flash interfaces (ONFI) to facilitate data communication with their memory controllers. ONFI-based data channels are expected to deliver high throughput and maintain precise calibration, ensuring minimal errors and failed transactions throughout the SSDs' entire operation. Typically, ONFI-based data channels undergo calibration using a semi-open loop approach. In this process, a memory controller writes a series of test patterns to NAND flash memory and subsequently reads them back. When errors surface during this read-back phase, a delay between the data signal and the strobe signal is identified as the maximum delay. The memory controller then adjusts the delay in the opposite direction to determine the minimum delay between these signals. The operational timing delay for the SSD is then established between these minimum and maximum delay values. Such calibration takes place either at the beginning of drive operation or in response to detection of a catastrophic event.

During normal operation, the firmware continuously monitors specific SSD characteristics, such as local drive temperature and voltage rail values. Based on these characteristics, the firmware makes educated assumptions about potential channel corruption due to variations and accordingly adjusts the timing between the data and strobe signals. This data channel calibration method is indirect and circumstantial since it relies on the SSD characteristics rather than the actual status of the data channels. This can sometimes result in inadvertent recalibrations triggered by unrelated voltage or temperature fluctuations. Furthermore, the memory controller lacks visibility into or measurement capabilities for timing edges encountered during an initial training sequence in the data channel. When the data channel surpasses a certain threshold and experiences a failure, data loss and performance degradation can occur, necessitating the memory controller to temporarily pause transactions and recalibrate the problematic data channel. It would be beneficial to develop an effective and efficient mechanism for managing data timing within a data channel of a memory system of an electronic system.

SUMMARY

Various embodiments of this application are directed to methods, systems, devices, and non-transitory computer-readable media for closed-loop controlling of data timing of a data interface within a memory system. The data interface is coupled between a memory module and a memory controller of the memory system, so is a dedicated sideband bus coupled and applied. An active re-training engine is applied in the memory controller to control data timing of the data interface based on a skew signal that is provided by the memory module and communicated over the dedicated sideband bus. Specifically, the active re-training engine is coupled to the dedicated sideband bus to form a dedicated sideband channel. A primary data channel is formed based on the data interface, and relies on the dedicated sideband channel to enable a closed loop feedback system for the memory system. The primary data channel is calibrated to adjust timing margins of a data signal and a strobe signal for the memory module dynamically. In an example, the data interface includes an open NAND flash interface (ONFI), and the memory module include an NAND flash memory and exchanges data with the memory controller via the ONFI. The dedicated sideband channel enables continuously monitoring of a timing condition of data transmitted at the ONFI, and is configured to detect a deviation event and dynamically adjust a timing delay (e.g., a skew time) between the data signal and the strobe signal.

In one aspect, a method is implemented to control data timing in a memory system. The memory system includes a controller, a memory module, and an input data bus coupled between the memory controller and the memory module. The method includes transmitting a data signal and a strobe signal via the input data bus from the memory controller to the memory module. The data signal includes a train of serial input data. The method further includes determining a skew time of the data signal with respect to the strobe signal and generating a skew signal including a train of serial skew data based on the skew time of the data signal. The method further includes transmitting the skew signal from the memory module to the memory controller via a dedicated sideband bus that is distinct from the input data bus.

In another aspect, a method is implemented to control data timing in a memory module of a memory system. The memory module is coupled to a controller of the memory system via at least an input data bus. The method includes obtaining a data signal and a strobe signal via the input data bus, and the data signal includes a train of serial input data. The method further includes determining a skew time of the data signal with respect to the strobe signal and generating a skew signal including a train of serial skew data based on the skew time of the data signal. The method further includes providing the skew signal from the memory module to the memory controller via a dedicated sideband bus that is distinct from the input data bus.

Some implementations of this application include an electronic system that includes one or more processors and memory having instructions stored thereon, which when executed by the one or more processors cause the processors to perform any of the above methods on a memory system (e.g., including one or more SSDs).

Some implementations of this application include a memory system that includes one or more processors and memory having instructions stored thereon, which when executed by the one or more processors cause the processors to perform any of the above methods on the memory system (e.g., including one or more SSDs).

Some implementations include a non-transitory computer readable storage medium storing one or more programs. The one or more programs include instructions, which when executed by one or more processors cause the processors to implement any of the above methods on a memory system (e.g., including one or more SSDs).

These illustrative embodiments and implementations are mentioned not to limit or define the disclosure, but to provide examples to aid understanding thereof. Additional embodiments are discussed in the Detailed Description, and further description is provided there.

BRIEF DESCRIPTION OF THE DRAWINGS

For a better understanding of the various described implementations, reference should be made to the Detailed Description below, in conjunction with the following drawings in which like reference numerals refer to corresponding parts throughout the figures.

Like reference numerals refer to corresponding parts throughout the several views of the drawings.

DETAILED DESCRIPTION

Figure 1:
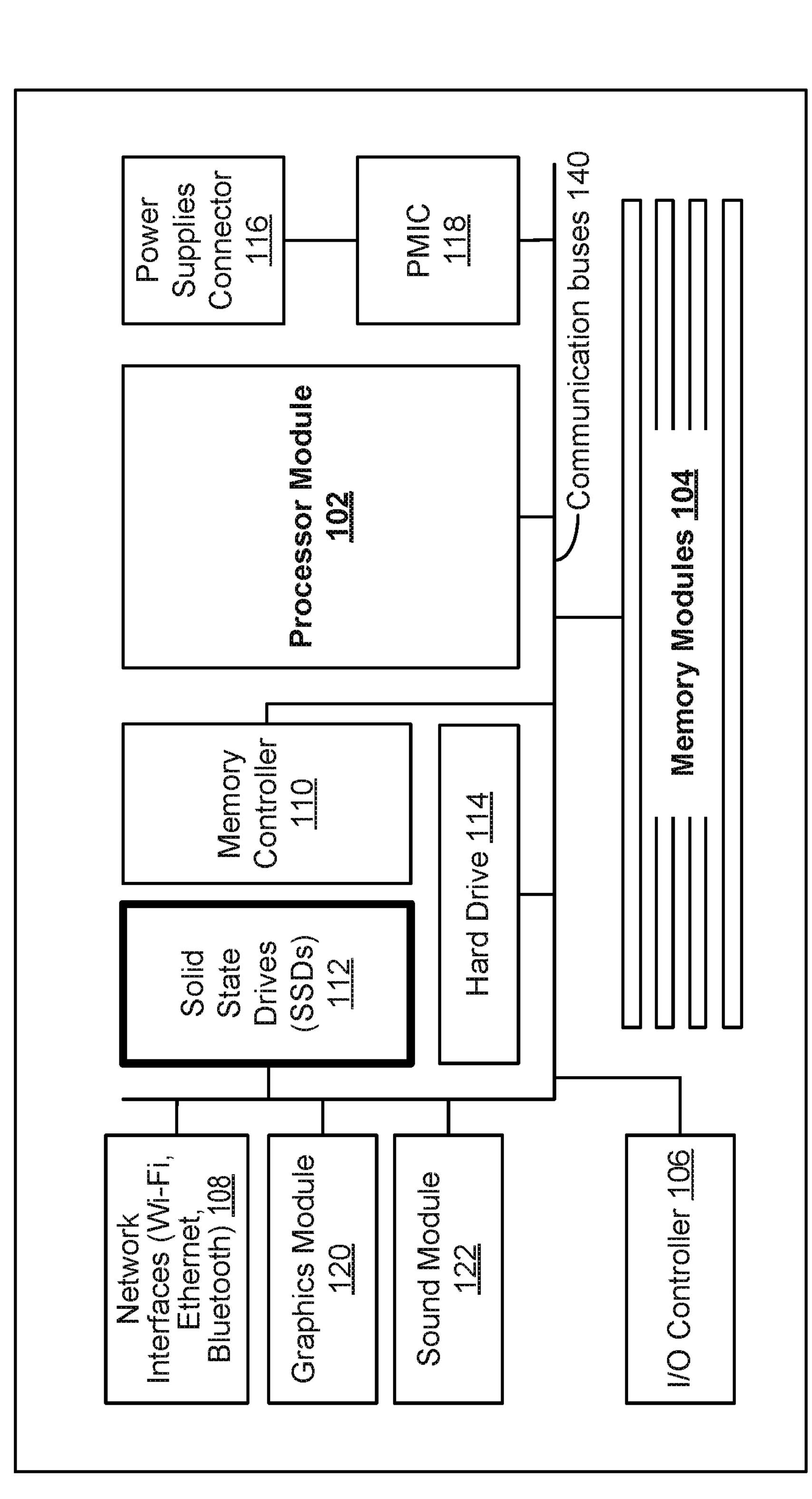
FIG. 1 is a block diagram of an example system module in a typical electronic system in accordance with some embodiments.

Reference will now be made in detail to specific embodiments, examples of which are illustrated in the accompanying drawings. In the following detailed description, numerous non-limiting specific details are set forth in order to assist in understanding the subject matter presented herein. But it will be apparent to one of ordinary skill in the art that various alternatives may be used without departing from the scope of claims and the subject matter may be practiced without these specific details. For example, it will be apparent to one of ordinary skill in the art that the subject matter presented herein can be implemented on many types of electronic systems or devices with data storage capabilities.

This application is directed to closed-loop controlling of data timing for a data interface coupled between a memory module and a memory controller within a memory system. A dedicated sideband bus is applied between the memory module and the memory controller in addition to the data interface. An active re-training engine is included in the memory controller of the memory system to control data timing in the memory system based on a skew signal that is provided by the memory module and communicated over the dedicated sideband bus. The active re-training engine continuously monitors a skew time between two ONFI bus data path signals (e.g., a data signal DQ and a strobe signal DQS) transmitted via the data interface. In some situations, the active re-training engine detects that a timing difference associated with the skew time deviates from a target skew time, and dynamically adjusts an internal clock generator on a controller side without having to stop data communication via an ONFI or forcing the firmware to enter a re-training sequence. This active re-training engine in the memory controller is further coupled to a skew analyzer in the memory module. The skew analyzer is configured to access the ONFI bus data path signals, generate a skew signal including the skew time, and provides the skew signal to the active re-training engine via the dedicated sideband bus. By these means, a closed-loop feedback system is enabled among the data interface, the active re-training engine, the skew analyzer, and the dedicated sideband bus to dynamically control data timing of the data interface between the memory module and the memory controller of the memory system.

Specifically, the closed-loop feedback system allows the memory controller firmware to focus on active data exchange, while the active retraining engine monitors and adjusts data timing with no or little intervention by the memory controller. Under some circumstances, the memory controller only intervenes to adjust the data interface or an associated bus in worst-case scenarios and/or catastrophic events. The closed-loop feedback system also reduces false positives, when a temperature or voltage drift on the memory module is used as an indirect indicator of a loss of data channel calibration to control a retraining sequence. In some embodiments, the dedicated sideband bus is added between the memory module and the memory controller in addition to a primary data bus (e.g., an ONFI data bus). The dedicated sideband bus is optionally applied with one or more additional pins or traces that do not fall into an existing data interface scheme (e.g., ONFI). In some embodiments, data traffic is monitored in this dedicated sideband bus, and a signal carried by the dedicated sideband bus varies with a skew time of the data signals carried by the primary data bus.

FIG. 1 is a block diagram of an example system module 100 in a typical electronic system in accordance with some embodiments. The system module 100 in this electronic system includes at least a processor module 102, memory modules 104 for storing programs, instructions and data, an input/output (I/O) controller 106, one or more communication interfaces such as network interfaces 108, and one or more communication buses 140 for interconnecting these components. In some embodiments, the I/O controller 106 allows the processor module 102 to communicate with an I/O device (e.g., a keyboard, a mouse or a track-pad) via a universal serial bus interface. In some embodiments, the network interfaces 108 includes one or more interfaces for Wi-Fi, Ethernet and Bluetooth networks, each allowing the electronic system to exchange data with an external source, e.g., a server or another electronic system. In some embodiments, the communication buses 140 include circuitry (sometimes called a chipset) that interconnects and controls communications among various system components included in system module 100.

In some embodiments, the memory modules 104 include high-speed random-access memory, such as DRAM, static random-access memory (SRAM), double data rate (DDR) dynamic random-access memory (RAM), or other random-access solid state memory devices. In some embodiments, the memory modules 104 include non-volatile memory, such as one or more magnetic disk storage devices, optical disk storage devices, flash memory devices, or other non-volatile solid state storage devices. In some embodiments, the memory modules 104, or alternatively the non-volatile memory device(s) within the memory modules 104, include a non-transitory computer readable storage medium. In some embodiments, memory slots are reserved on the system module 100 for receiving the memory modules 104.

Once inserted into the memory slots, the memory modules 104 are integrated into the system module 100.

In some embodiments, the system module 100 further includes one or more components selected from a memory controller 110, SSDs 112, a hard disk drive (HDD) 114, power management integrated circuit (PMIC) 118, a graphics module 120, and a sound module 122. The memory controller 110 is configured to control communication between the processor module 102 and memory components, including the memory modules 104, in the electronic system. The SSDs 112 are configured to apply integrated circuit assemblies to store data in the electronic system, and in many embodiments, are based on NAND or NOR memory configurations. The HDD 114 is a conventional data storage device used for storing and retrieving digital information based on electromechanical magnetic disks. The power supply connector 116 is electrically coupled to receive an external power supply. The PMIC 118 is configured to modulate the received external power supply to other desired DC voltage levels, e.g., 5V, 3.3V or 1.8V, as required by various components or circuits (e.g., the processor module 102) within the electronic system. The graphics module 120 is configured to generate a feed of output images to one or more display devices according to their desirable image/video formats. The sound module 122 is configured to facilitate the input and output of audio signals to and from the electronic system under control of computer programs.

It is noted that communication buses 140 also interconnect and control communications among various system components including components 110-122.

Further, one skilled in the art knows that other non-transitory computer readable storage media can be used, as new data storage technologies are developed for storing information in the non-transitory computer readable storage media in the memory modules 104 and in SSDs 112. These new non-transitory computer readable storage media include, but are not limited to, those manufactured from biological materials, nanowires, carbon nanotubes and individual molecules, even though the respective data storage technologies are currently under development and yet to be commercialized.

Figure 2:
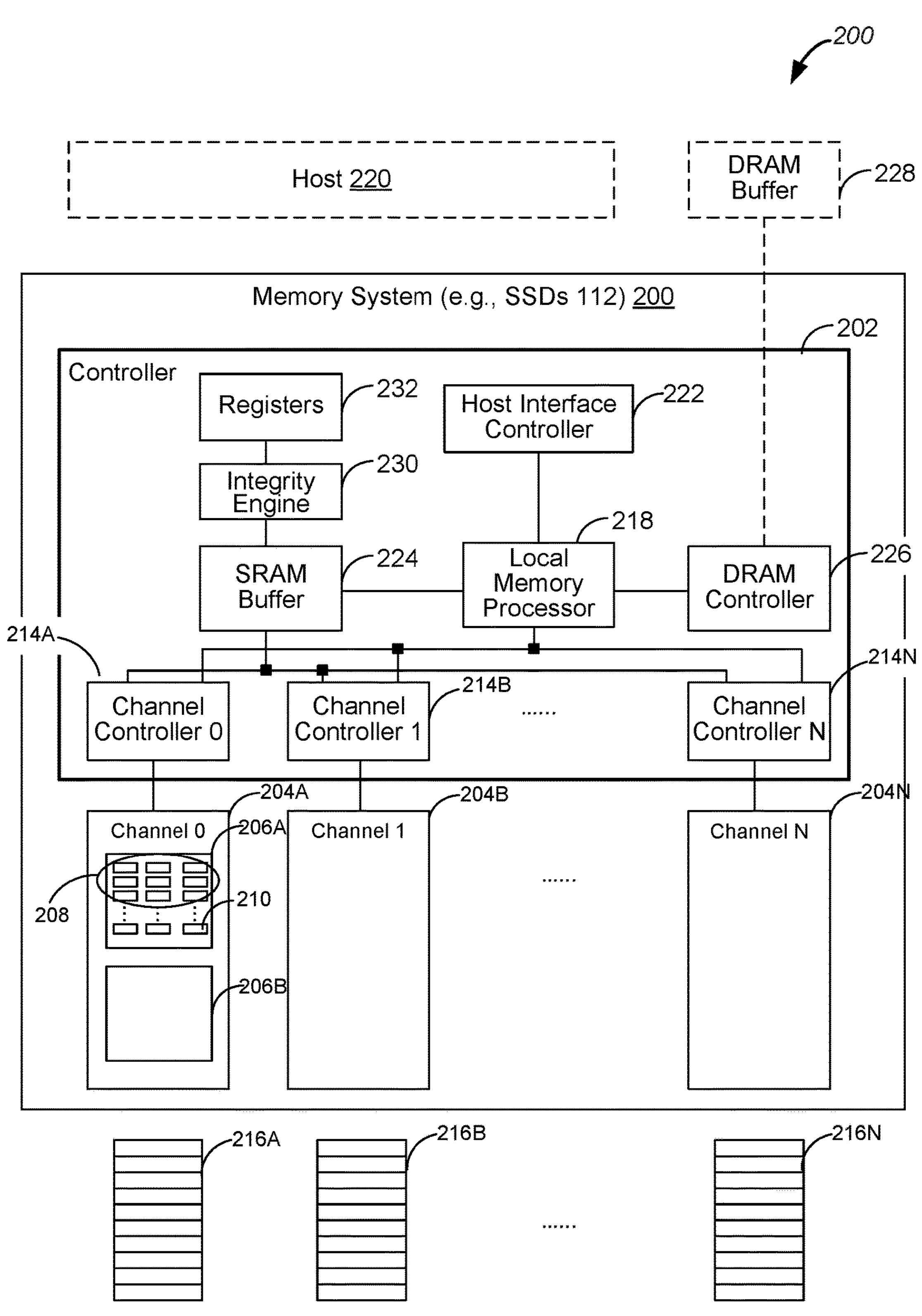
FIG. 2 is a block diagram of a memory system of an example electronic system having one or more memory access queues, in accordance with some embodiments.

FIG. 2 is a block diagram of a memory system 200 of an example electronic device having one or more memory access queues, in accordance with some embodiments. The memory system 200 is coupled to a host device 220 (e.g., a processor module 102 in FIG. 1) and configured to store instructions and data for an extended time, e.g., when the electronic device sleeps, hibernates, or is shut down. The host device 220 is configured to access the instructions and data stored in the memory system 200 and process the instructions and data to run an operating system and execute user applications. The memory system 200 further includes a controller 202 and a plurality of memory channels 204 (e.g., channel 204A, 204B, and 204N). Each memory channel 204 includes a plurality of memory cells. The controller 202 is configured to execute firmware level software to bridge the plurality of memory channels 204 to the host device 220.

Each memory channel 204 includes on one or more memory packages 206 (e.g., two memory dies). In an example, each memory package 206 (e.g., memory package 206A or 206B) corresponds to a memory die. Each memory package 206 includes a plurality of memory planes 208, and each memory plane 208 further includes a plurality of memory pages 210. Each memory page 210 includes an ordered set of memory cells, and each memory cell is identified by a respective physical address. In some embodiments, the memory system 200 includes a plurality of superblocks. Each superblock includes a plurality of memory blocks each of which further includes a plurality of memory pages 210. For each superblock, the plurality of memory blocks are configured to be written into and read from the memory system via a memory input/output (I/O) interface concurrently. Optionally, each superblock groups memory cells that are distributed on a plurality of memory planes 208, a plurality of memory channels 204, and a plurality of memory dies 206. In an example, each superblock includes at least one set of memory pages, where each page is distributed on a distinct one of the plurality of memory dies 206, has the same die, plane, block, and page designations, and is accessed via a distinct channel of the distinct memory die 206. In another example, each superblock includes at least one set of memory blocks, where each memory block is distributed on a distinct one of the plurality of memory dies 206 includes a plurality of pages, has the same die, plane, and block designations, and is accessed via a distinct channel of the distinct memory die 206. The memory system 200 stores information of an ordered list of superblocks in a cache of the memory system 200. In some embodiments, the cache is managed by a host driver of the host device 220, and called a host managed cache (HMC).

In some embodiments, the memory system 200 includes a single-level cell (SLC) NAND flash memory chip, and each memory cell stores a single data bit. In some embodiments, the memory system 200 includes a multi-level cell (MLC) NAND flash memory chip, and each memory cell of the MLC NAND flash memory chip stores 2 data bits. In an example, each memory cell of a triple-level cell (TLC) NAND flash memory chip stores 3 data bits. In another example, each memory cell of a quad-level cell (QLC) NAND flash memory chip stores 4 data bits. In yet another example, each memory cell of a penta-level cell (PLC) NAND flash memory chip stores 5 data bits. In some embodiments, each memory cell can store any suitable number of data bits. Compared with the non-SLC NAND flash memory chips (e.g., MLC SSD, TLC SSD, QLC SSD, PLC SSD), the SSD that has SLC NAND flash memory chips operates with a higher speed, a higher reliability, and a longer lifespan, and however, has a lower device density and a higher price.

Each memory channel 204 is coupled to a respective channel controller 214 (e.g., controller 214A, 214B, or 214N) configured to control internal and external requests to access memory cells in the respective memory channel 204. In some embodiments, each memory package 206 (e.g., each memory die) corresponds to a respective queue 216 (e.g., queue 216A, 216B, or 216N) of memory access requests. In some embodiments, each memory channel 204 corresponds to a respective queue 216 of memory access requests. Further, in some embodiments, each memory channel 204 corresponds to a distinct and different queue 216 of memory access requests. In some embodiments, a subset (less than all) of the plurality of memory channels 204 corresponds to a distinct queue 216 of memory access requests. In some embodiments, all of the plurality of memory channels 204 of the memory system 200 corresponds to a single queue 216 of memory access requests. Each memory access request is optionally received internally from the memory system 200 to manage the respective memory channel 204 or externally from the host device 220 to write or read data stored in the respective channel 204. Specifically, each memory access request includes one of: a system write request that is received from the memory system 200 to write to the respective memory channel 204, a system read request that is received from the memory system 200 to read from the respective memory channel 204, a host write request that originates from the host device 220 to write to the respective memory channel 204, and a host read request that is received from the host device 220 to read from the respective memory channel 204. It is noted that system read requests (also called background read requests or non-host read requests) and system write requests are dispatched by a memory controller to implement internal memory management functions including, but are not limited to, garbage collection, wear levelling, read disturb mitigation, memory snapshot capturing, memory mirroring, caching, and memory sparing.

In some embodiments, in addition to the channel controllers 214, the memory controller 202 further includes a local memory processor 218, a host interface controller 222, an SRAM buffer 224, and a DRAM controller 226. The local memory processor 218 accesses the plurality of memory channels 204 based on the one or more queues 216 of memory access requests. In some embodiments, the local memory processor 218 writes into and read from the plurality of memory channels 204 on a memory block basis. Data of one or more memory blocks are written into, or read from, the plurality of channels jointly. No data in the same memory block is written concurrently via more than one operation. Each memory block optionally corresponds to one or more memory pages. In an example, each memory block to be written or read jointly in the plurality of memory channels 204 has a size of 16 KB (e.g., one memory page). In another example, each memory block to be written or read jointly in the plurality of memory channels 204 has a size of 64 KB (e.g., four memory pages). In some embodiments, each page has 16 KB user data and 2 KB metadata. Additionally, a number of memory blocks to be accessed jointly and a size of each memory block are configurable for each of the system read, host read, system write, and host write operations.

In some embodiments, the local memory processor 218 stores data to be written into, or read from, each memory block in the plurality of memory channels 204 in an SRAM buffer 224 of the memory controller 202. Alternatively, in some embodiments, the local memory processor 218 stores data to be written into, or read from, each memory block in the plurality of memory channels 204 in a DRAM buffer 228 that is in memory system 200. Alternatively, in some embodiments, the local memory processor 218 stores data to be written into, or read from, each memory block in the plurality of memory channels 204 in a DRAM buffer 228 that is main memory used by the processor module 102 (FIG. 1). The local memory processor 218 of the memory controller 202 accesses the DRAM buffer 228 via the host interface controller 222.

In some embodiments, data in the plurality of memory channels 204 is grouped into coding blocks, and each coding block is called a codeword. For example, each codeword includes n bits among which k bits correspond to user data and (n-k) corresponds to integrity data of the user data, where k and n are positive integers. In some embodiments, the memory system 200 includes an integrity engine 230 (e.g., an LDPC engine) and registers 232 including a plurality of registers or SRAM cells or flip-flops and coupled to the integrity engine 230. The integrity engine 230 is coupled to the memory channels 204 via the channel controllers 214 and SRAM buffer 224. Specifically, in some embodiments, the integrity engine 230 has data path connections to the SRAM buffer 224, which is further connected to the channel controllers 214 via data paths that are controlled by the local memory processor 218. The integrity engine 230 is configured to verify data integrity for each coding block of the memory channels 204.

Figure 3:
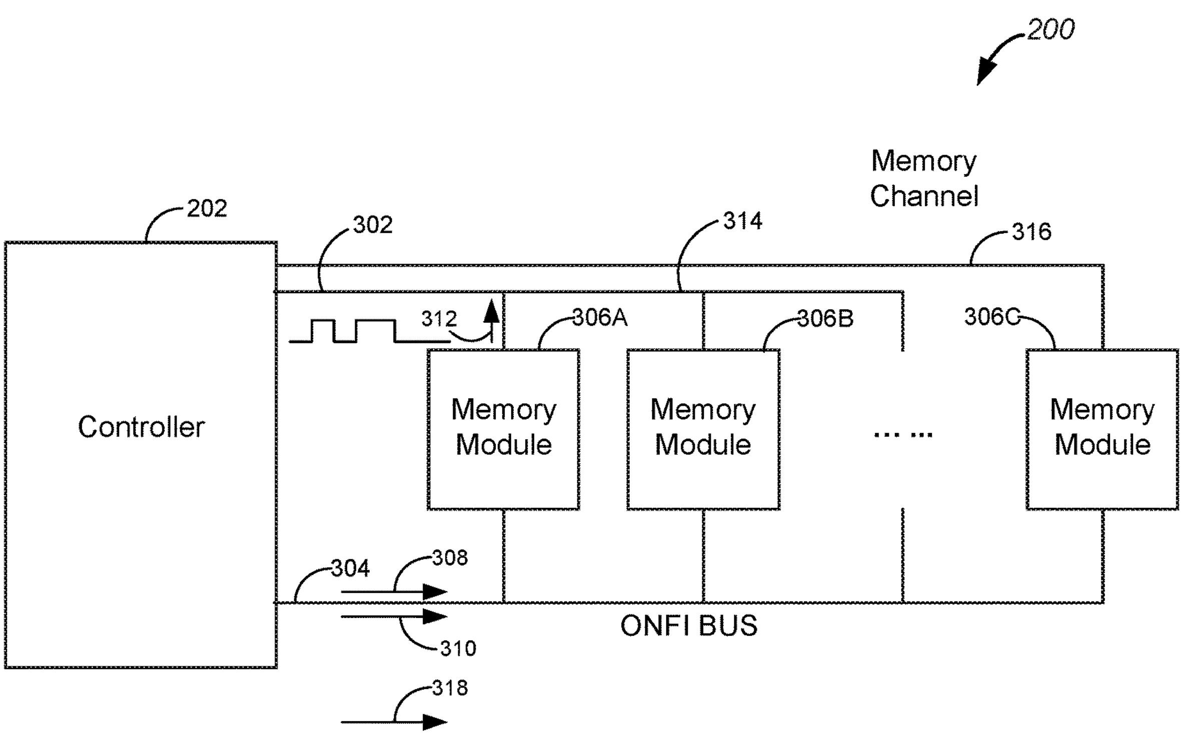
FIG. 3 is a block diagram of an example memory system having a dedicated sideband bus, in accordance with some embodiments.

FIG. 3 is a block diagram of an example memory system 200 having a dedicated sideband bus 302, in accordance with some embodiments. The memory system 200 includes a controller 202, an input data bus 304, a memory module 306A, and the dedicated sideband bus 302. The memory controller is coupled between the memory controller 202 and the memory module 306A, and configured to provide a data signal 308 (DQ) and a strobe signal 310 (DQS). The data signal 308 (DQ) includes a train of serial input data. The memory module 306A is configured to obtain the data signal 308 (DQ) and the strobe signal 310 (DQS) via the input data bus 304, determine a skew time of the data signal with respect to the strobe signal, and generate a skew signal 312 including a train of serial skew data based on the skew time of the data signal 308 (DQ). The dedicated sideband bus 302 is also coupled between the memory module 306A and the memory controller 202. The dedicated sideband bus 302 is distinct from the input data bus 304, and is configured to communicate the skew signal 312 from the memory module 306A to the memory controller 202. In some embodiments, the input data bus 304 and the dedicated sideband bus 302 have different data rates. A first data rate of the input data bus 304 is greater than a second data rate of the dedicated sideband bus 302. In an example, the input data bus 304 has a first data rate of 667 million transfers per second (MT/s) or 800 MT/s, and the dedicated sideband bus 302 has a second data rate of 3.4 megabits per second (Mbps).

In some embodiments, the memory module 306A includes a memory die 206 (FIG. 2) for which the dedicated sideband bus 302 is applied to communicate the skew signal 312. In some embodiments, the memory module 306A includes a memory channel 204 (FIG. 2) including a plurality of memory dies 206 for which the dedicated sideband bus 302 is applied to communicate the skew signal 312.

In some embodiments, the memory system 200 includes one or more additional memory modules (e.g., 306B and 306C). Referring to FIG. 3, in some embodiments, an additional memory module 306B corresponds to a dedicated sideband bus 314 that is coupled between the memory controller 202 and the respective additional memory module 306B. The dedicated sideband bus 314 and the dedicated sideband bus 302 of the memory module 306A merge with one another and enters the memory controller 202 as a single bus. Skew signals 312 carried by the merged dedicated sideband buses 314 and 302 are encoded with identification information of the memory modules 306A and 306B, such that the memory controller 202 can determine whether a certain train of serial skew data of the skew signal 312 comes from the memory module 304A or 304B. Conversely, in some embodiments not shown, an additional memory module 306C corresponds to a distinct dedicated sideband bus 316 that is coupled between the memory controller 202 and the respective additional memory module 306B and distinct from other dedicated sideband bus 302 and 314. The memory controller receives only the skew signal 312 of the memory module 306C via the dedicated sideband bus 316.

In some embodiments, the skew time of the data signal 308 (DQ) measured for the memory module 306A is digitalized to generate intermediate skew data, which is serialized to generate the train of serial skew data of the skew signal 312 provided to the memory controller 202 via the dedicated sideband bus 302. In some embodiments, the memory controller 202 receives the skew signal 312 including the train of serial skew data, and determines a skew adjustment control (e.g., 406 in FIG. 4) based on the skew time corresponding to the skew signal including the train of serial skew data. The memory controller 202 dynamically adjusts the data signal 308 (DQ) to be provided to the memory module 306A, 306B, or 306C based on the skew adjustment control. Further, in some embodiments, the memory controller 202 recovers the skew time corresponding to the skew signal 312 including the train of serial skew data from the skew signal 312 and compares the skew time with a skew reference.

In some situations, the data signal 308 is faster than the strobe signal 310, and the skew time is negative and less than 0. In some embodiments, in accordance with a determination that the skew time is less than the skew reference, which is less than 0, or in accordance with a determination that the negative skew time decreases, the skew adjustment control is configured to increase a delay of a clock signal used to generate the data signal 308 (DQ), thereby increasing the negative skew time of the data signal 308 (DQ). The delay of the clock signal CLK is optionally increased by decreasing a frequency of the clock signal CLK. Alternatively, in some situations, the data signal 308 is slower than the strobe signal 310, and the skew time is positive and greater than 0. Additionally, in some embodiments, in accordance with a determination that the skew time is greater than the skew reference, which is greater than 0, the skew adjustment control is configured to reduce a delay of the clock signal used to generate the data signal 308 (DQ), thereby reducing the skew time of the data signal 308 (DQ). The delay of the clock signal CLK is optionally decreased by increasing a frequency of the clock signal CLK. The clock signal or data signal 308 (DQ) drifts due to a temperature drift, a power supply change, and/or an operating voltage drift. The skew adjustment control is applied to compensate for the skew time between the data and strobe signals 308 (DQ) and 310 (DQS), which is caused to the memory controller 202, memory module 306A, and/or the input data bus 304 by the temperature drift, power supply change, and/or operating voltage drift.

In some embodiments, the input data bus 304 includes an open NAND flash interface (ONFI) configured to communicate data in compliance with one of a plurality of ONFI specifications. The ONFI complies with a standard interface protocol (e.g., including the ONFI specifications) established by an industry working group made up of more than 80 companies building, designing, or enabling NAND flash memory. The ONFI is configured to simplify NAND flash integration into consumer electronic products, computing platforms, and any other application that requires solid state mass storage. Further, in some embodiments, the input data bus 304 includes a bidirectional data bus. The data signal 308 (DQ) and the strobe signal 310 (DQS) are transmitted along a forward direction of the input data bus 304. The input data bus 304 further includes a backward direction opposite to the forward direction, and for example, data extracted from memory cells of the memory module 306A is transmitted back to the memory controller 202 via the input data bus 304 along the backward direction.

In some embodiments, the dedicated sideband bus 302 includes a unidirectional data bus from the memory module 306A to the memory controller 202. The skew signal 312 is transmitted from the memory module 306A to the memory controller 202. Further, in some embodiments, the dedicated sideband bus 302 includes only the skew signal 312. Alternatively, in some embodiments, the dedicated sideband bus 302 is also a bidirectional data bus coupled between the memory module 306A and the memory controller 202. The memory controller 202 is configured to transmit user instructions and data from the memory controller 202 to the memory module 306A and via the dedicated sideband bus 302. The user instructions and data are distinct from those transmitted via the data signal 308 (DQ) and the strobe signal 310 (DQS).

In some embodiments, the memory module 306A includes a memory channel 204 having a plurality of memory dies 206 (FIG. 2), and the skew time of the data signal 308 (DQ) is associated with a first memory die 206 of the memory module 306A. For each of one or more second memory dies of the memory module 306A, the memory module 306A determines a respective skew time of a second data signal with respect to a second strobe signal. The skew time of the first memory die and the respective skew time of each second memory die are serialized on the skew signal 312.

Figure 4:
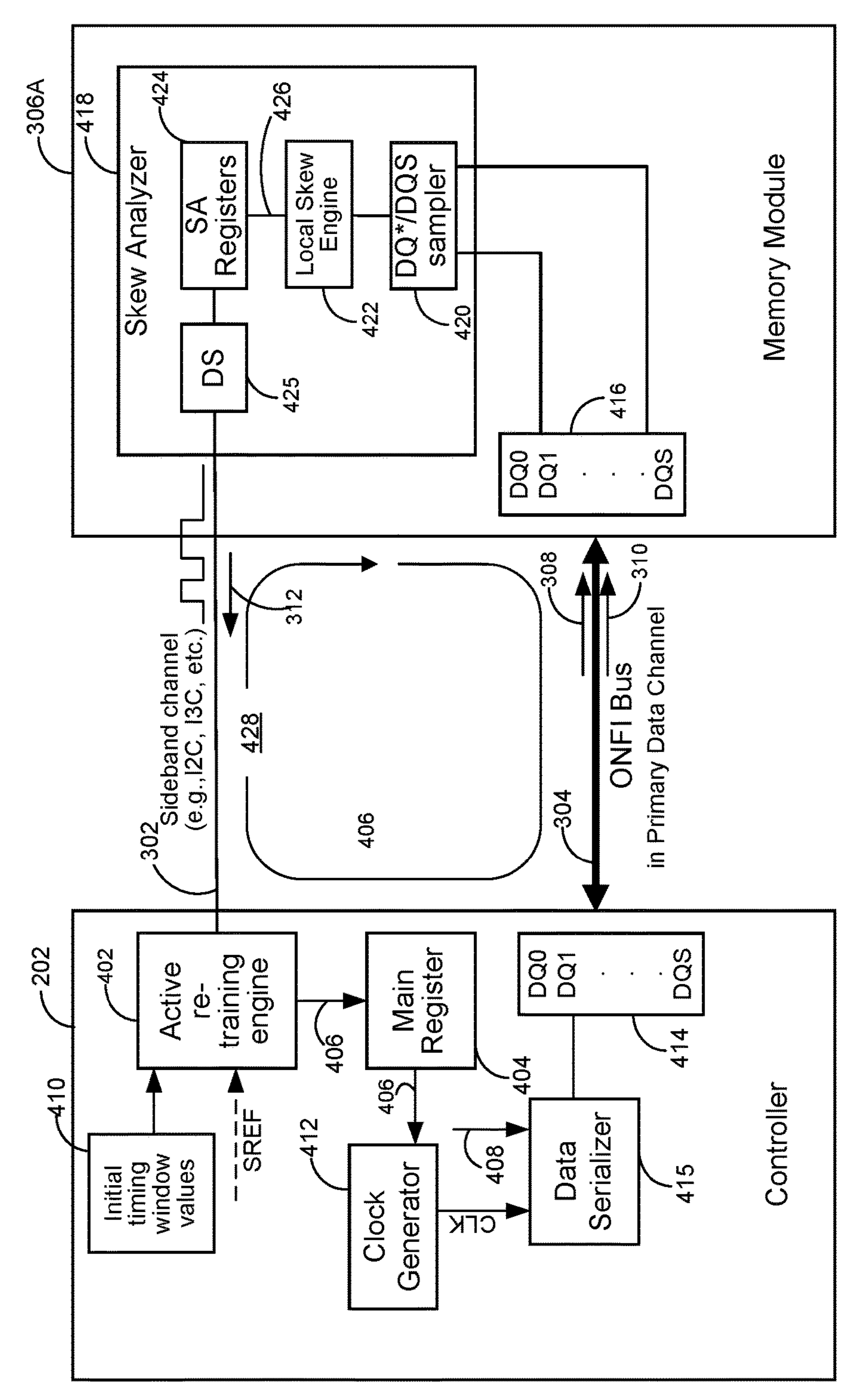
FIG. 4 is a block diagram of another example memory system having a dedicated sideband bus, in accordance with some embodiments.

FIG. 4 is a block diagram of another example memory system 200 having a dedicated sideband bus 302, in accordance with some embodiments. The memory system 200 includes a controller 202 configured to provide a data signal 308 (DQ) and a strobe signal 310 (DQS) and a memory module 306A configured to be accessed for a memory operation in accordance with a data signal 308 (DQ), which includes a memory access command. An input data bus 304 is coupled between the memory controller 202 and the memory module 306A, so is the dedicated sideband bus 302. The data signal 308 (DQ) includes a train of serial input data, and the serial input data optionally includes the memory access command for accessing the memory module 306A. The memory module 306A is configured to obtain the data signal 308 (DQ) and the strobe signal 310 (DQS) via the input data bus 304, determine a skew time of the data signal 308 (DQ) with respect to the strobe signal 310 (DQS), and generate a skew signal 312 including a train of serial skew data based on the skew time of the data signal 308 (DQ). The dedicated sideband bus 302 is distinct from the input data bus 304, and is configured to communicate the skew signal 312 from the memory module 306A to the memory controller 202.

In some embodiments, the memory controller 202 further includes an active re-training engine 402 and a main register 404. The active-re-training engine 402 receives the skew signal 312 including the train of serial skew data and determines a skew adjustment control 406 based on the skew time. The main register 404 is coupled to the active re-training engine 402, and configured to store the skew adjustment control 406. In some embodiments, the engine 402 compares the skew data recovered from the skew signal 312 with a skew reference SREF to determine the skew adjustment control 406. Alternatively, in some embodiments, the engine 402 compares the recovered skew data with historic skew data to determine a skew trend on which the skew adjustment control 406 is further determined. In some embodiments, the memory controller 202 includes a clock generator 412 (e.g., a delayed-locked loop (DLL)) for generating a clock signal CLK. The clock generator 412 is controlled by the skew adjustment control 406 to vary a clock frequency of the clock signal CLK. In some embodiments, the memory controller 202 includes a controller data serializer 415 to serialize input data 408 to generate the data signal 308 (DQ) based on the clock signal CLK. Further, in some embodiments, the memory controller 202 further includes a memory register storing initial timing window values 410. This initial timing window values 410 define a window that includes a skew timing value observed and/or measured during early production of the SSD. This window is used at a device boot time such that in the initial use of the SSD the sideband channel 302 and the active retraining engine 402 start operating at a known valid skew value. In some embodiments, the memory controller 202 further includes a controller data interface 414 coupled to the input data bus 304 and configured to pair the data signal 308 (DQ) with the strobe signal 310 (DQS) and output the signals 308 (DQ) and 310 (DQS) to the input data bus 304.

In some embodiments, the memory module 306A further includes a module data interface 416 and a skew analyzer 418. The data interface 416 is coupled to the input data bus 304 and configured to receive the data signal 308 (DQ) and the strobe signal 310 (DQS). The skew analyzer 418 determines the skew time of the data signal 308 (DQ) with respect to the strobe signal 310 (DQS) and generate the skew signal 312 including the train of serial skew data based on the skew time of the data signal 308 (DQ). In some embodiments, the skew analyzer 418 includes one or more of: a data sampler 420, a local skew engine 422, and a secondary register 424, and a module data serializer 425. The data sampler 420 samples the data signal 308 (DQ) and the strobe signal 310 (DQS), and the local skew engine 422 determine intermediate skew data 426 corresponding to the skew time of the data signal 308 (DQ). The secondary register 424 stores the intermediate skew data 426, and the module data serializer 425 serializes the intermediate skew data 426 corresponding to the skew time of the data signal 308 (DQ) to generate the skew signal 312 including the train of serial skew data. In some embodiments, the local skew engine 422 generates a skew voltage level corresponding to the skew time of the data signal 308 and digitalizes the skew voltage level to the intermediate skew data 426.

In some embodiments, the dedicated sideband bus 302 includes one of an inter-integrated circuit (I2C) based serial communication bus and an improved inter-integrated circuit (I3C) based serial communication bus, which couples the memory module 306A as a main device to the memory controller 202 as a secondary device. The dedicated sideband bus 302 is configured to communicate the skew signal 312 including the train of serial skew data, and the skew signal 312 is converted from intermediate skew data 426 that is determined based on the skew time of the data signal 308 (DQ). In an example, the skew time of the data signal 308 (DQ) is determined by the local skew engine 422 as a skew voltage level that is proportional to the skew time of the data signal 308 (DQ), and the skew voltage level is digitalized to generate the intermediate skew data 426. The skew signal 312 is communicated via the dedicated sideband bus 302 jointly with an I2C clock signal. In some embodiments, the dedicated sideband bus 302 is not limited to the I2C or I3C based serial communication bus, and applies another data communication protocol that already exists or will be developed.

In some embodiments, the active re-training engine 402 is applied to monitor the skew signal 312 that indicates the skew time of the data signal 308 (DQ) with respect to the strobe signal 310 (DQS) in a dynamic manner. The skew analyzer 418 of the memory module 306A takes a sample of an incoming data packet, measures a skew between a target DQ bit and the strobe signal 310 (DQS), and stores the intermediate skew data 426 corresponding to the skew time of the data signal 308 (DQ) in the secondary register 424. The intermediate skew data 426 corresponding to the skew time of the data signal 308 (DQ) is accessed by the active re-training engine 402 of the memory controller 202 via the sideband bus 302 with a certain cadence. Further, in some embodiments, a primary data channel includes the data interfaces 414 and 416 and the input data bus 304. The active re-training engine 402 runs heuristics on the intermediate skew data 426 or other associated channel data (e.g., carried by the skew signal 312) to determine whether the primary data channel is healthy and/or whether the memory module 306A is healthy, i.e., to determine whether the data signal 308 and the strobe signal 310 are synchronized in the primary data channel and the memory module 306A.

In some embodiments, a threshold event occurs and detected. For example, the skew time is monitored between the data signal 308 (DQ) and the strobe signal 310 (DQS). In accordance with a determination that the skew time has increased for at least a predefined number of samples identified by the data sampler 420, the active re-training engine 402 adjusts a clock parameter (e.g., frequency, delay) of the clock signal CLK by writing a skew adjustment control 406 associated with the clock parameter in the main register 404. The clock generator 412 automatically loads the skew adjustment control 406. Specifically, a delay of the clock signal CLK is adjusted based on the skew adjustment control 406. When the input data 408 is serialized according to the data signal 308 using the adjusted clock signal CLK, the skew time of the data signal 308 is automatically compensated with respect to the strobe signal 312, thereby reducing the skew time of the data signal 308 to be measured by the skew analyzer 418. During this process, the memory controller 202 continues its normal operation without having to stop the primary data channel, unless some form of fatal error is detected or any other re-training condition.

In some embodiments, the local skew engine 422 automatically measures incoming skew of the data signal 308 and stores the intermediate skew data 426 in the register 424. In some embodiments, the register 424 further stores emergency break point data and interrupt monitoring data. In some embodiments, the active re-training engine 402 has an access to the main register 404 configured to provide configurations of the clock generator 412. For example, the main register 404 stores a set of skew data including a minimum skew time and a maximum skew time measured via one or more training sequences. In some embodiments, the active re-training engine 402 compares the skew time recovered from the skew signal 312 with one or more skew references and determines the skew adjustment control 406 accordingly based on a comparison result. Alternatively, in some embodiments, the active re-training engine 402 builds a histogram of current and previous skew times and determines the skew adjustment control 406 based on the histogram.

In some embodiments, the active re-training engine 402 of the memory controller 202 identifies the memory module 306A, 306B, or 306C and accesses a secondary register 424 of the memory module 306A via the dedicated sideband bus 302. An address of the secondary register 424 of the memory module 306A is optionally identified from a remote internal register map. The active re-training engine 402 receives the skew signal 312 and extracts a current skew time of the data signal 308 of the memory module 306A. In some situations, the current skew time is compared with one or more historic skew times, e.g., to determine a skew time trend. In accordance with a determination that the current skew time is within a predefined skew range, the active re-training engine 402 does not take any action. In accordance with a determination that the current skew time satisfies a condition (e.g., falls out of the predefined skew range), the active re-training engine 402 generates a skew adjustment control 406 to adjust the clock generator 412 and generate the clock signal CLK having a desirable clock parameter (e.g., frequency, delay). For example, in some situations, in accordance with a determination that the skew time of the data signal 308 increases for a number of samples, the skew adjustment control 406 is generated to control the clock generator 412 to increase a higher frequency of the clock signal CLK. As the memory controller 202 sets up a higher operating point with a higher clock frequency, the skew time is monitored by the memory module 306A to confirm that the skew time of the data signal 308 drops. By these means, a closed loop feedback system 428 is formed based on the input data bus 304 and the dedicated sideband bus 302 to control the skew time of the data signal 308 with respect to the strobe signal 310 dynamically.

In some embodiments, in accordance with a determination that the memory module 306A encounters a fault condition (e.g., an emergency break point) or an interrupt condition, the active re-training engine 402 of the memory controller 202 detects the fault or interrupt condition via the skew signal 312 returned via the dedicated sideband bus 302 and addresses the fault or interrupt condition before any other command is extracted from the data signal 308 and processed by the memory module 306A.

Figure 5:
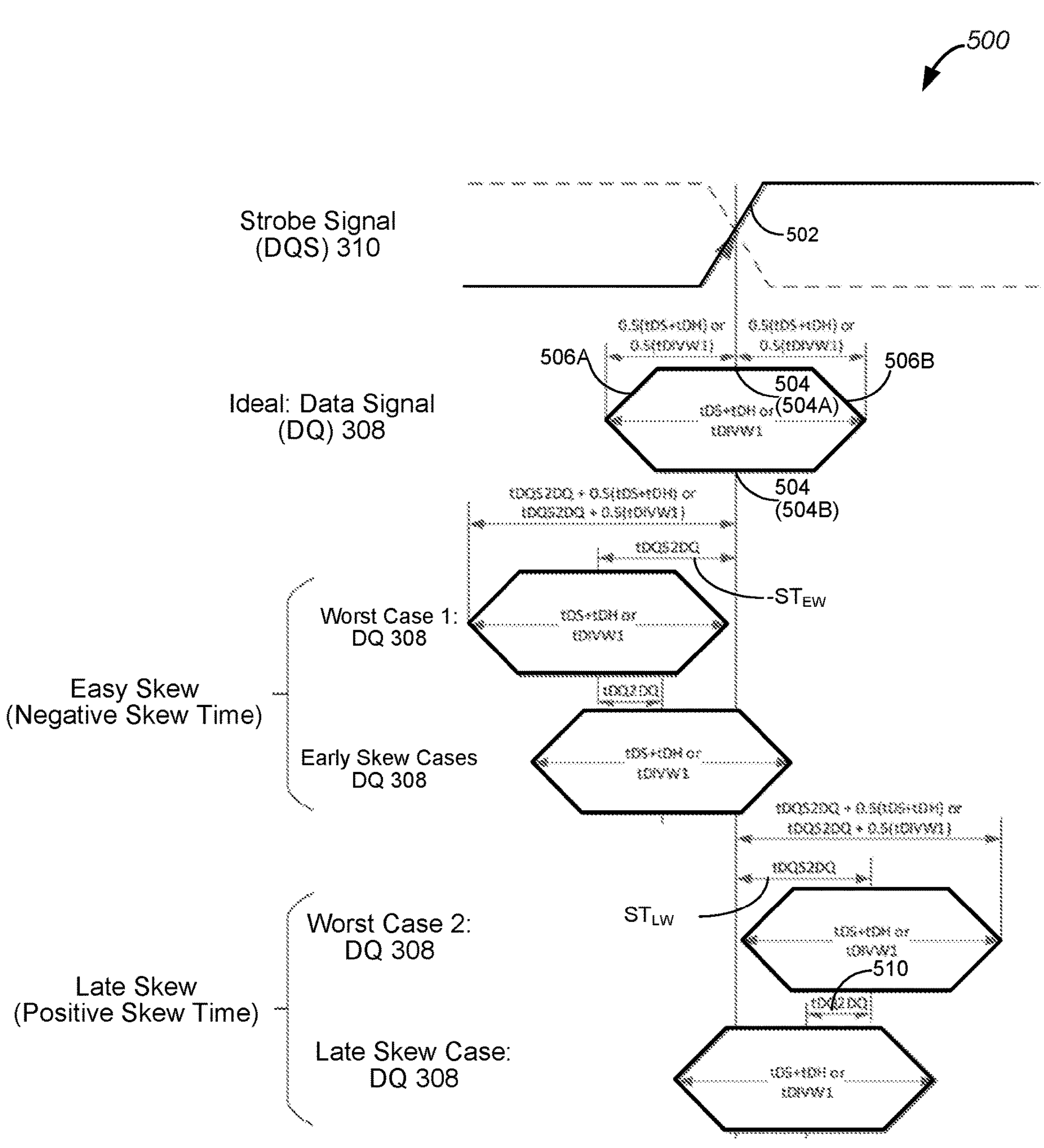
FIG. 5 is a set of temporal diagrams of example signals that are communicated between a memory controller 202 a memory module of a memory system, in accordance with some embodiments.

FIG. 5 is a set of temporal diagrams of example signals 500 that are communicated between a memory controller 202 and a memory module 306A of a memory system 200, in accordance with some embodiments. A data signal 308 and a strobe signal 310 are provided by the memory controller 202 and received by the memory module 306A. A skew time of the data signal 308 is measured with respect to the strobe signal 310. Ideally, an edge 502 of the strobe signal 310 is synchronized with (e.g., received by the memory module 306A concurrently with) a middle point 504 of a voltage level of the data signal 308, and the skew time of the data signal 308-I is substantially small. The skew time is optional equal to 0 or below a threshold small time (e.g., <1 ns). In some situations, the middle point 504 of a voltage level of the data signal 308 is received prior to the edge 502 of the strobe signal 310, and the skew time is negative and less than 0. Alternatively, in some situations, the middle point 504 of a voltage level of the data signal 308 is received subsequently to the edge 502 of the strobe signal 310, and the skew time is positive and greater than 0.

Specifically, in some embodiments, a skew analyzer 418 of the memory module 306A measures a first time difference $T_1$ between a middle point 504 of a voltage level of the data signal 308 with respect to an edge 502 of the strobe signal 310 and determines the skew time of the data signal as the first time difference $T_1$. The middle point 504 includes one of a first middle point 504A on a high voltage level of the data signal 308 and a second middle point 504B on a low voltage level of the data signal 308. The edge 502 includes one of a rise edge or a fall edge of the strobe signal 310. In some embodiments associated with an ideal situation, the first time difference $T_1$ is substantially small (e.g., 0), and the skew time of the data signal 308 is substantially small (e.g., 0) with respect to the strobe signal 310.

Alternatively, in some embodiments, the skew analyzer 418 of the memory module 306A measures a second time difference $T_2$ between a first edge 506A or 506B of the data signal 308 with respect to a edge 502 of the strobe signal 310 and determines the skew time of the data signal based on the second time difference $T_2$. The first edge includes one of a rise edge 506A or a fall edge 506B of the data signal 308. The edge 502 includes one of a rise edge or a fall edge of the strobe signal 310. In some embodiments associated with an ideal situation, the second time difference $T_2$ is equal to a portion (e.g., ¼) of a clock cycle, and the skew time of the data signal 308 is equal to a difference of the second time difference $T_2$ and the portion of the clock cycle, which is substantially small (e.g., 0).

In some situations, the middle point 504 of a voltage level of the data signal 308 is received prior to the edge 502 of the strobe signal 310, and the skew time is negative and less than 0. In the worst case, the skew time of the data signal 308 is determined to be equal to the worst early skew time $-ST_{EW}$ with respect to the strobe signal 310. Conversely, in some situations, the middle point 504 of a voltage level of the data signal 308 is received subsequently to the edge 502 of the strobe signal 310, and the skew time is positive and greater than 0. In the worst case, the skew time of the data signal 308 is determined to be equal to the worst late skew time $ST_{LW}$ with respect to the strobe signal 310. The skew time of the data signal 308 varies between the worst skew times $-ST_{EW}$ and $ST_{LW}$, inclusively.

In some situations, the data signal 308 is faster than the strobe signal 310, and the skew time is negative and less than 0. In some embodiments, in accordance with a determination that the skew time is less than the skew reference, which is less than 0, or in accordance with a determination that the negative skew time decreases, the skew adjustment control 406 is configured to increase a delay of a clock signal CLK used to generate the data signal 308 (DQ), thereby increasing the negative skew time of the data signal 308 (DQ). The delay of the clock signal CLK is optionally increased by decreasing a frequency of the clock signal CLK. Further, in some embodiments, the skew reference is equal to the worst skew time $-ST_{EW}$. Alternatively, in some situations, the data signal 308 is slower than the strobe signal 310, and the skew time is positive and greater than 0. In some embodiments, in accordance with a determination that the skew time is greater than the skew reference, which is greater than 0, or in accordance with a determination that the positive skew time increases, the skew adjustment control is configured to reduce a delay of the clock signal used to generate the data signal 308 (DQ), thereby reducing the skew time of the data signal 308 (DQ). The delay of the clock signal CLK is optionally decreased by increasing a frequency of the clock signal CLK. Further, in some embodiments, the skew reference is equal to the worst skew time $ST_{LW}$.

In some embodiments, the data signal 308 are monitored during two durations to determine a first skew time in a first duration, a second skew time in a second duration, and/or a temporal variation of the first and second skew times. A first duration of the data signal 308 is shifted to be aligned with a second duration of the data signal 308. A temporal shift 510 of a rising edge, a falling edge, or a middle point of a voltage level of the data signal 308 is determined for the first and second durations. The second skew time of the data signal 308 is determined based on the temporal shift 510 and the first skew time of the data signal 308. For example, the skew time of the data signal 308 at a late skew case is determined based on the temporal shift 510 with the worst case of the last skew and the worst late skew time $ST_{LW}$ of the data signal 308.

In some embodiments, the data signal 308 including a first data signal. A second data signal 318 (FIG. 3) is communicated with the first data signal 308 and the strobe signal 310. A delay time of the second data signal 318 is determined with respect to the first data signal 308. A second skew time of the second data signal 318 is determined with respect to the skew signal based on the delay time and the skew time of the first data signal 308.

In some embodiments, each of the data signal 308 and the strobe signal 310 includes a respective differential signal.

The skew time of the data signal 308 is measured based on a difference time $T_1$ or $T_2$, which is measured between a middle point 504 of a voltage level or an edge 506A or 506B of the data signal 308 and an edge 502 of the strobe signal 310, respectively.

Figure 6:
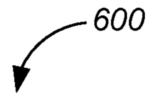
FIG. 6 a flow diagram of an example method for controlling data timing in a memory system, in accordance with some embodiments.
Figure 6:
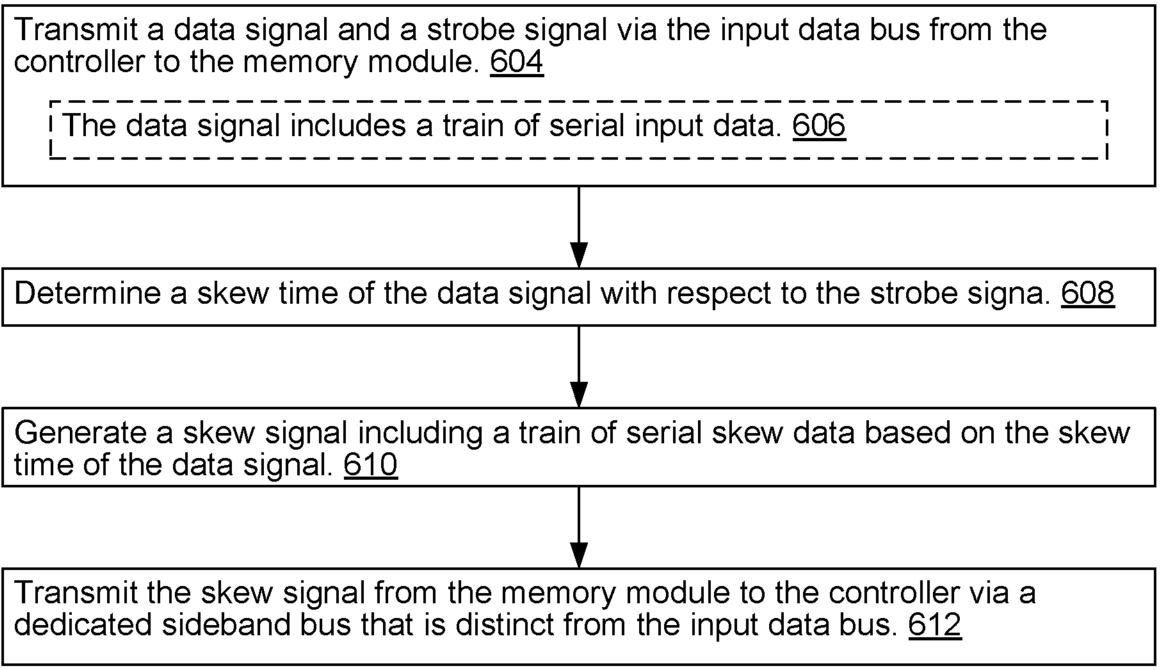

FIG. 6 a flow diagram of an example method 600 for controlling data timing in a memory system 200, in accordance with some embodiments. An electronic system includes a host device 220 and the memory system 200 coupled to the host device 220. The memory system 200 further includes (operation 602) a controller 202, a memory module 306A (e.g., a memory channel 204), and an input data bus 304 coupled between the memory controller 202 and the memory module 306A. The memory system 200 transmits (operation 604) a data signal 308 and a strobe signal 310 via the input data bus 304 from the memory controller 202 to the memory module 306A. The data signal 308 includes (operation 606) a train of serial input data. The memory system 200 determines (operation 608) a skew time of the data signal 308 with respect to the strobe signal 310, generates (operation 610) a skew signal 312 including a train of serial skew data based on the skew time of the data signal 308, and transmits (operation 612) the skew signal 312 from the memory module 306A to the memory controller 202 via a dedicated sideband bus 302 that is distinct from the input data bus 304.

In some embodiments, the memory system 200 generates the skew signal 312 by digitalizing the skew time of the data signal 308 to intermediate skew data 426 and serializing the intermediate skew data 426 to the train of serial skew data of the skew signal 312.

In some embodiments, the memory controller 202 receives the skew signal 312 including the train of serial skew data, determines a skew adjustment control 406 based on the skew time corresponding to the skew signal 312 including the train of serial skew data, and dynamically adjusts the data signal 308 based on the skew adjustment control 406. Further, in some embodiments, the memory controller 202 determines the skew adjustment control 406 by recovering the skew time corresponding to the skew signal 312 including the train of serial skew data from the skew signal 312 and comparing the skew time with a skew reference SREF that is greater than 0. In accordance with a determination that the skew time is greater than the skew reference SREF, the skew adjustment control 406 is configured to reduce a delay of a clock signal CLK used to generate the data signal 308, thereby reducing the skew time of the data signal 308. The delay of the clock signal CLK is optionally reduced by increasing a frequency of the clock signal CLK. Alternatively, in some embodiments, the memory controller 202 determines the skew adjustment control 406 by recovering the skew time corresponding to the skew signal 312 including the train of serial skew data from the skew signal 312 and comparing the skew time with a skew reference SREF that is less than 0. In accordance with a determination that the skew time is less than the skew reference SREF, the skew adjustment control 406 is configured to increase a delay of a clock signal CLK used to generate the data signal 308, thereby reducing the skew time of the data signal 308. The delay of the clock signal CLK is optionally increased by decreasing a frequency of the clock signal CLK. Under some circumstances, the clock signal CLK or data signal 308 is temporally shifted due to a temperature drift, power supply change, operating voltage drift.

Additionally, in some embodiments, the memory controller 202 determines the skew adjustment control 406 by recovering the skew time corresponding to the skew signal 312 including the train of serial skew data from the skew signal 312. In accordance with a determination that the skew time gradually increases, the skew adjustment control 406 is to reduce a delay of a clock signal CLK used to generate data signal 308. In accordance with a determination that the skew time gradually decreases, the skew adjustment control 406 is set to increase the delay of the clock signal CLK.

In some embodiments, the memory system 200 determines the skew time of the data signal 308 with respect to the strobe signal 310 by measuring a first time difference $T_1$ between a middle point 504 of a voltage level of the data signal 308 with respect to an edge 502 of the strobe signal 310. Alternatively, in some embodiments, the memory system 200 determines the skew time of the data signal 308 with respect to the strobe signal 310 by measuring a second time difference $T_2$ between a first edge 506A or 506B of the data signal 306 with respect to a second edge 502 of the strobe signal 310. More details on determining the skew time of the data signal 308 are discussed above with reference to FIG. 5.

In some embodiments, the data signal 308 includes a first data signal. The memory controller 202 communicates a second data signal 308 with the first data signal 308 and the strobe signal 310 to the memory module 306A. A delay time of the second data signal 308 is determined with respect to the first data signal 308. A second skew time of the second data signal is determined with respect to the skew signal 312 based on the delay time and the skew time of the first data signal.

In some embodiments, wherein the input data bus 304 includes an open NAND flash interface (ONFI) configured to communicate data in compliance with one of a plurality of ONFI specification. The ONFI complies with a standard interface protocol established by an industry working group made up of more than 80 companies building, designing, or enabling NAND flash memory. The ONFI is configured to simplify NAND flash integration into consumer electronic products, computing platforms, and any other application that requires solid state mass storage.

In some embodiments, wherein the input data bus 304 includes a bidirectional data bus, and the dedicated sideband bus 302 includes a unidirectional data bus from the memory module 306A to the memory controller 202.

In some embodiments, the dedicated sideband bus 302 includes one of an inter-integrated circuit (I2C) based serial communication bus and an improved inter-integrated circuit (I3C) based serial communication bus, which couples the memory module 306A as a main device to the memory controller 202 as a secondary device. The dedicated sideband bus 302 is configured to communicate the skew signal 312 including the train of serial skew data, and the skew signal 312 is converted from intermediate skew data 426 that is determined based on the skew time of the data signal 308 to. The skew signal 312 is communicated via the dedicated sideband bus 302 jointly with an I2C clock signal CLK.

In some embodiments, the dedicated sideband bus 302 includes only the skew signal 312.

In some embodiments, the memory module 306A includes a memory die 206 or a memory channel 204.

In some embodiments, the memory module 306A includes a memory channel having a plurality of memory dies, and the skew time of the data signal 308 is associated with a first memory die of the memory module 306A. A respective skew time of a second data signal 308 is determined for each of one or more second memory dies of the memory module 306A and with respect to a second strobe signal 310. The skew time of the first memory die and the respective skew time of each second memory die are serialized on the skew signal 312.

In some embodiments, each of the data signal 308 and the strobe signal 310 includes a respective differential signal.

In some embodiments, the input data bus 304 and the dedicated sideband bus 302 have different data rates.

In another aspect of this application, a memory system 200 includes a memory controller 202, an input data bus 304, a memory module 306A, and a dedicated sideband bus 302. The memory controller 202 is configured to provide a data signal 308 and a strobe signal 310. The data signal 308 includes a train of serial input data. The input data bus 304 is coupled to the memory controller 202. The memory module 306A is coupled to the memory controller 202 via the input data bus 304, and configured to obtain the data signal 308 and the strobe signal 310 via the input data bus 304, determine a skew time of the data signal 308 with respect to the strobe signal 310, and generate a skew signal 312 including a train of serial skew data based on the skew time of the data signal 308. The dedicated sideband bus 302 is coupled between the memory module 306A and the memory controller 202, and is configured to communicate the skew signal 312 from the memory module 306A to the memory controller 202. The dedicated sideband bus 302 is distinct from the input data bus 304.

In some embodiments, the memory module 306A further includes a data interface 416 (FIG. 4) configured to receive the data signal 308 and the strobe signal 310, and a skew analyzer 418 configured to determine the skew time of the data signal 308 with respect to the strobe signal 310 and generate the skew signal 312 including the train of serial skew data based on the skew time of the data signal 308.

In some embodiments, the skew analyzer 418 of the memory module 306A further comprises one or more of: a data sampler 420 for sampling the data signal 308 and the strobe signal 310, a local skew engine 422 for determining the skew time of the data signal 308 and generating intermediate skew data 426 corresponding to the skew time, a secondary register 424 for storing the intermediate skew data 426, and a module data serializer 425 for serializing the intermediate skew data 426 corresponding to the skew time of the data signal 308 to the train of serial skew data of the skew signal 312.

In some embodiments, the memory controller 202 further includes one or more of: an active re-training engine 402 for receiving the skew signal 312 including the train of serial skew data and determining a skew adjustment control 406 based on the skew time, a main register 404 coupled to the active re-training engine 402 and configured for storing the skew data of the data signal 308, a memory register storing initial timing window values 410, a clock generator 412 for receiving the skew adjustment control 406 and generating the clock signal CLK having a frequency controlled based on the skew adjustment control 406, and a controller data serializer 415 for generating the data signal 308 and the strobe signal 310 by at least serializing input data based on the clock signal CLK. More details on the memory controller 202 and the memory module 306A are discussed above with reference to FIG. 4.

From a different perspective, a method is implemented at a memory module 306A for controlling data timing in a memory system 200. The memory module 306A is coupled to the memory controller 202 of the memory system via an input data bus 304. The memory module 306A obtains a data signal 308 and a strobe signal 310 via the input data bus 304, and the data signal 308 includes a train of serial input data. The memory module 306A determines a skew time of the data signal 308 with respect to the strobe signal 310, generates a skew signal 312 including a train of serial skew data based on the skew time of the data signal 308, and provides the skew signal 312 from the memory module 306A to the memory controller 202 via a dedicated sideband bus 302 that is distinct from the input data bus 304.

Memory is also used to store instructions and data associated with the method 600, and includes high-speed random-access memory, such as DRAM, SRAM, DDR RAM, or other random access solid state memory devices; and, optionally, includes non-volatile memory, such as one or more magnetic disk storage devices, one or more optical disk storage devices, one or more flash memory devices, or one or more other non-volatile solid state storage devices. The memory, optionally, includes one or more storage devices remotely located from one or more processing units. Memory, or alternatively the non-volatile memory within memory, includes a non-transitory computer readable storage medium. In some embodiments, memory, or the non-transitory computer readable storage medium of memory, stores the programs, modules, and data structures, or a subset or superset for implementing method 600.

Each of the above identified elements may be stored in one or more of the previously mentioned memory devices, and corresponds to a set of instructions for performing a function described above. The above identified modules or programs (i.e., sets of instructions) need not be implemented as separate software programs, procedures, modules or data structures, and thus various subsets of these modules may be combined or otherwise re-arranged in various embodiments. In some embodiments, the memory, optionally, stores a subset of the modules and data structures identified above. Furthermore, the memory, optionally, stores additional modules and data structures not described above.

The terminology used in the description of the various described implementations herein is for the purpose of describing particular implementations only and is not intended to be limiting. As used in the description of the various described implementations and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof. Additionally, it will be understood that, although the terms "first," "second," etc. may be used herein to describe various elements, these elements should not be limited by these terms. These terms are only used to distinguish one element from another.

As used herein, the term "if" is, optionally, construed to mean "when" or "upon" or "in response to determining" or "in response to detecting" or "in accordance with a determination that," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]" or "in accordance with a determination that [a stated condition or event] is detected," depending on the context.

The foregoing description, for purpose of explanation, has been described with reference to specific embodiments. However, the illustrative discussions above are not intended to be exhaustive or to limit the claims to the precise forms disclosed. Many modifications and variations are possible in view of the above teachings. The embodiments were chosen and described in order to best explain principles of operation and practical applications, to thereby enable others skilled in the art.

Although various drawings illustrate a number of logical stages in a particular order, stages that are not order dependent may be reordered and other stages may be combined or broken out. While some reordering or other groupings are specifically mentioned, others will be obvious to those of ordinary skill in the art, so the ordering and groupings presented herein are not an exhaustive list of alternatives. Moreover, it should be recognized that the stages can be implemented in hardware, firmware, software or any combination thereof.

What is claimed is:

1. A method for controlling data timing in a memory system, the method comprising:

at the memory system, which includes a controller, a memory module, and an input data bus coupled between the controller and the memory module:

transmitting a data signal and a strobe signal via the input data bus from the controller to the memory module;

determining a skew time of the data signal with respect to the strobe signal;

generating a skew signal including a train of serial skew data based on the skew time of the data signal, including:

digitalizing the skew time of the data signal to generate intermediate skew data; and serializing the intermediate skew data to the train of serial skew data of the skew signal; and transmitting the skew signal from the memory module to the controller via a dedicated sideband bus that is distinct from the input data bus.

2. The method of claim 1, wherein the data signal including a train of serial input data.

3. The method of claim 1, further comprising, at the controller:

receiving the skew signal including the train of serial skew data;

determining a skew adjustment control based on the skew time corresponding to the skew signal including the train of serial skew data; and dynamically adjusting the data signal based on the skew adjustment control.

4. The method of claim 3, determining the skew adjustment control further comprising:

recovering the skew time corresponding to the skew signal including the train of serial skew data from the skew signal;

comparing the skew time with a skew reference that is greater than 0; and in accordance with a determination that the skew time is greater than the skew reference, setting the skew adjustment control to reduce a delay of a clock signal used to generate the data signal.

5. The method of claim 3, determining the skew adjustment control further comprising:

recovering the skew time corresponding to the skew signal including the train of serial skew data from the skew signal;

comparing the skew time with a skew reference that is less than 0; and in accordance with a determination that the skew time is less than the skew reference, setting the skew adjustment control to increase a delay of a clock signal used to generate the data signal.

6. The method of claim 3, determining the skew adjustment control further comprising:

recovering the skew time corresponding to the skew signal including the train of serial skew data from the skew signal;

in accordance with a determination that the skew time increases, setting the skew adjustment control to reduce a delay of a clock signal used to generate data signal; and in accordance with a determination that the skew time decreases, setting the skew adjustment control to increase the delay of the clock signal.

7. The method of claim 1, determining the skew time of the data signal with respect to the strobe signal further comprising one of:

measuring a first time difference between a middle point of a voltage level of the data signal with respect to an edge of the strobe signal; and measuring a second time difference between a first edge of the data signal with respect to a second edge of the strobe signal.

8. The method of claim 1, the data signal including a first data signal, the method further comprising:

communicating a second data signal with the first data signal and the strobe signal;

determining a delay time of the second data signal with respect to the first data signal; and determining a second skew time of the second data signal with respect to the skew signal based on the delay time and the skew time of the first data signal.

9. The method of claim 1, wherein the input data bus includes an open NAND flash interface (ONFI) configured to communicate data in compliance with one of a plurality of ONFI specification.

10. The method of claim 1, wherein the input data bus includes a bidirectional data bus, and the dedicated sideband bus includes a unidirectional data bus from the memory module to the controller.

11. The method of claim 1, wherein:

the dedicated sideband bus includes one of an inter-integrated circuit (I2C) based serial communication bus and an improved inter-integrated circuit (I3C) based serial communication bus, which couples the memory module as a main device to the controller as a secondary device;

the dedicated sideband bus is configured to communicate the skew signal including the train of serial skew data, and the skew signal is converted from intermediate skew data that is determined based on the skew time of the data signal; and the skew signal is communicated via the dedicated sideband bus jointly with an I2C clock signal.

12. The method of claim 1, wherein the dedicated sideband bus includes only the skew signal.

13. The method of claim 1, wherein the memory module includes a memory die or a memory channel.

14. The method of claim 1, wherein the memory module includes a memory channel having a plurality of memory dies, and the skew time of the data signal is associated with a first memory die of the memory module, the method further comprising:

for each of one or more second memory dies of the memory module, determining a respective skew time of a second data signal with respect to a second strobe signal, wherein the skew time of the first memory die and the respective skew time of each second memory die are serialized on the skew signal.

15. The method of claim 1, wherein each of the data signal and the strobe signal includes a respective differential signal.

16. The method of claim 1, wherein the input data bus and the dedicated sideband bus have different data rates.

17. A memory system, comprising:

a controller configured to provide a data signal and a strobe signal;

an input data bus coupled to the controller;

a memory module coupled to the controller via the input data bus, the memory module configured to obtain the data signal and the strobe signal via the input data bus, determine a skew time of the data signal with respect to the strobe signal, and generate a skew signal including a train of serial skew data based on the skew time of the data signal; wherein the memory module is configured to generate the skew signal by at least:

digitalizing the skew time of the data signal to generate intermediate skew data; and serializing the intermediate skew data to the train of serial skew data of the skew signal;

a dedicated sideband bus coupled between the memory module and the controller, the dedicated sideband bus is distinct from the input data bus, and is configured to communicate the skew signal from the memory module to the controller.

18. The memory system of claim 17, wherein the memory module further comprises:

a data interface configured to receive the data signal and the strobe signal; and a skew analyzer configured to determine the skew time of the data signal with respect to the strobe signal and generate the skew signal including the train of serial skew data based on the skew time of the data signal.

19. The memory system of claim 18, wherein the skew analyzer of the memory module further comprises one or more of:

a data sampler for sampling the data signal and the strobe signal;

a local skew engine for determining the skew time of the data signal and generating the intermediate skew data corresponding to the skew time;

a secondary register for storing the intermediate skew data; and a module data serializer for serializing the intermediate skew data corresponding to the skew time of the data signal to the train of serial skew data of the skew signal.

20. The memory system of claim 17, wherein the controller further comprises one or more of:

an active re-training engine for receiving the skew signal including the train of serial skew data and determining a skew adjustment control based on the skew time;

a main register coupled to the active re-training engine, the main register configured for storing the skew time of the data signal;

a memory register storing initial timing window values;

a clock generator for receiving the skew adjustment control and generating a clock signal having a frequency controlled based on the skew adjustment control; and a controller data serializer for generating the data signal and the strobe signal by at least serializing input data based on the clock signal.

* * * * *